United States Patent [19]

Henrichon, Jr.

[11] 4,365,234

[45] Dec. 21, 1982

[54] SEGMENTATION SYSTEM AND METHOD FOR OPTICAL CHARACTER SCANNING

[75] Inventor: Ernest G. Henrichon, Jr., Bedford, N.H.

[73] Assignee: Hendrix Electronics, Inc., Manchester, N.H.

[21] Appl. No.: 198,303

[22] Filed: Oct. 20, 1980

[51] Int. Cl.³ .............................................. G06K 9/34
[52] U.S. Cl. .......................................... 340/146.3 SY
[58] Field of Search ............ 340/146.3 SY, 146.3 SG, 340/146.3 MA, 146.3 AC, 146.3 R; 364/518, 521, 523, 515

[56] References Cited

U.S. PATENT DOCUMENTS

| | | |
|---|---|---|
| 3,519,990 | 7/1970 | Holt et al. |
| 3,526,876 | 9/1970 | Baumgartner et al. |
| 3,629,826 | 12/1971 | Cutaia et al. ............ 340/146.3 SG |
| 3,694,807 | 9/1972 | Bond et al. |
| 3,930,228 | 12/1975 | Spanjersberg ............ 340/146.3 SG |
| 4,003,023 | 1/1977 | Benson et al. |
| 4,045,773 | 8/1977 | Kadota et al. |
| 4,083,034 | 4/1978 | Hicks |
| 4,225,943 | 9/1980 | Busch |

OTHER PUBLICATIONS

Baumgartner, R. J., Buettner, J. A. & Miller, G. D., "Left-Side Detection Segmentation", IBM Technical Disclosure Bulletin, vol. 17, No. 2, Jul. 1974, (pp. 508-509).
Hoffman, R. L. & McCullough, J. W., "Segmentation Methods for Recognition of Machine-printed Characters", IBM J. Res. Dev, Mar. 1971, (pp. 153-165).
"System for Reading Printed Text", IEEE Transactions on Computers, Dec. 1971, (pp. 1530-1531).
Parks, J. R., Elliott, J. Rosemary & Cowin, G. "Simulation of an Alphanumeric Character Recognition System for Unsegmented Low Quality Print", (pp. 95-105).
Clayden, D. O., Clowes, M. B. & Parks, J. R., "Letter Recognition and the Segmentation of Running Test", Information and Control 9, (pp. 246-263).
Atrubin, A. J., Benson, G. G. & Siverling, M. M., "Narrow Gap Detection for Optical Scanners", IBM Technical Disclosure Bulletin, vol. 16, No. 11, Apr. 1974, (pp. 3737-3738).
Gray, Stephen B., "Scan Logic for a Versatile Page Reader", Research Note 370, Applied Research Laboratory, Sylvania Electronic Systems, Project No. 531, Dec. 12, 1962, (pp. 1-10).
McCullough, J. W., "Character Separation for Proportional-Space Printing", IBM Technical Disclosure Bulletin, vol. 13, No. 7, Dec. 1970, (pp. 1979-1980).
Kooi, Robert & Lin, Wen C., "An On-Line Minicomputer-based system for Reading Printed Text Aloud", IEEE Transactions on Systems, Man, and Cybernetics, vol. SMC-8, No. 1, Jan. 1978, (pp. 57-62).

*Primary Examiner*—Leo H. Boudreau
*Attorney, Agent, or Firm*—Lahive & Cockfield

[57] ABSTRACT

A segmentation method and system for detecting intercharacter boundaries for a digital representation of a string of two or more characters extending in a first (X) direction. The digital representation has the form of an m x n array of bits, each being representative of a characteristic (such as optical reflectivity) of a correspondingly positioned picture element (pixel) in an image of the string of characters. A serpentine processor determines a succession of values of interest per swath in the array. A decision network processes the succession of values determined by the serpentine processor to identify a nominal boundary where segmentation is to occur. A separation processor performs the segmentation by associating the various bits representative of black pixels near the nominal intercharacter boundary with either the character to the left or the character to the right of that nominal boundary.

18 Claims, 23 Drawing Figures

```
NUMBER REGIONS/SWATH 0 1 1 1 2 2 2 2 2 1 1 1 2 2 2 2 2 1 1 1 0
NUMBER STREAM STARTS 0 1 0 0 1 0 0 0 0 0 0 0 0 0 0 0 0 0 0 0 0
NUMBER STREAM ENDS   0 0 0 0 0 0 0 0 0 0 0 0 0 0 0 0 1 0 0 1 0
```

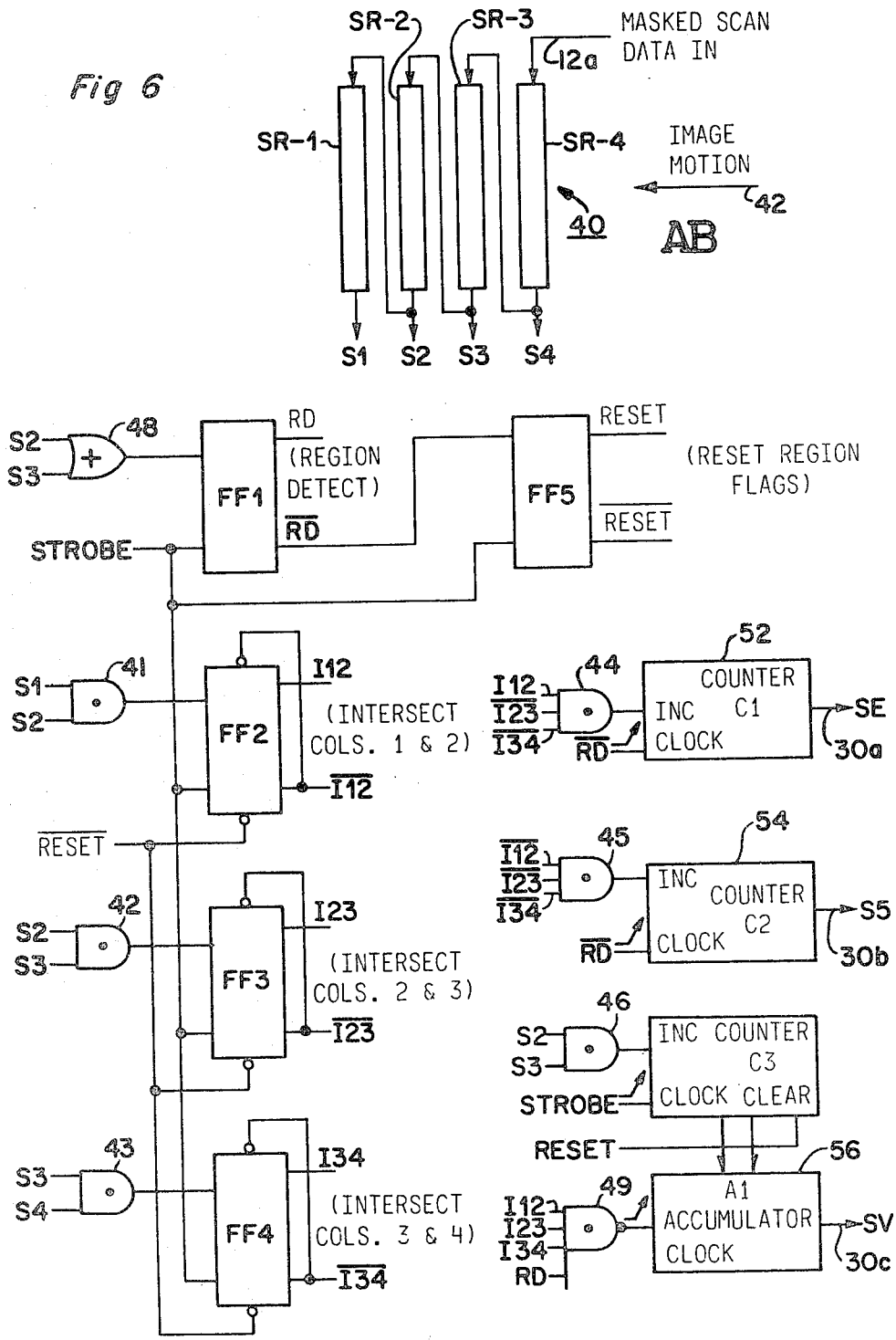

```
            5   10  15  20 25  30  35  40

25

20
                                       XXX
           XXXXXXX     XXXXXXX     XXXXXXXXXXXX
      15   XXXXXXX     XXXXXXX     XXXXXXXXXXXX
           XXXXX          XXXX XXXXX         XXXX
           XXXX      X    XXX  XXXX           XXX
             XXXX  XXXX   XXX  XXX             XX
             XXXX  XXXX   XXX XXXX
      10     XXXX  XXXXX  XXX XXXX
             XXXX XXXXX   XXX XXXX
              XXX XXXXXXXX XXX  XXX         XXXXXXXX
             XXXXXX  XXXXXXX  XXXX          XXXXXXXXX
             XXXXXXX XXXXXXX   XXX              XXXX
      5      XXXXXX  XXXXXXX   XXXX                XXX
             XXXXXX   XXXXX    XXXX                XXXX
             XXXXXX   XXXXX    XXXXX              XXXXX
             XXXXX    XXXX     XXXXXXXXXXXXXX
              XXX     XXXX          XXXXXXXXXX
      0
             5    10  15  20  25  30  35  40  45  50

SV  008XX98645556679XX73009X555544556567XXX00
    SS  100000000000010000001000000000100000000
    SE  00000000100000000000001000000000000000011
```

*Fig 7*

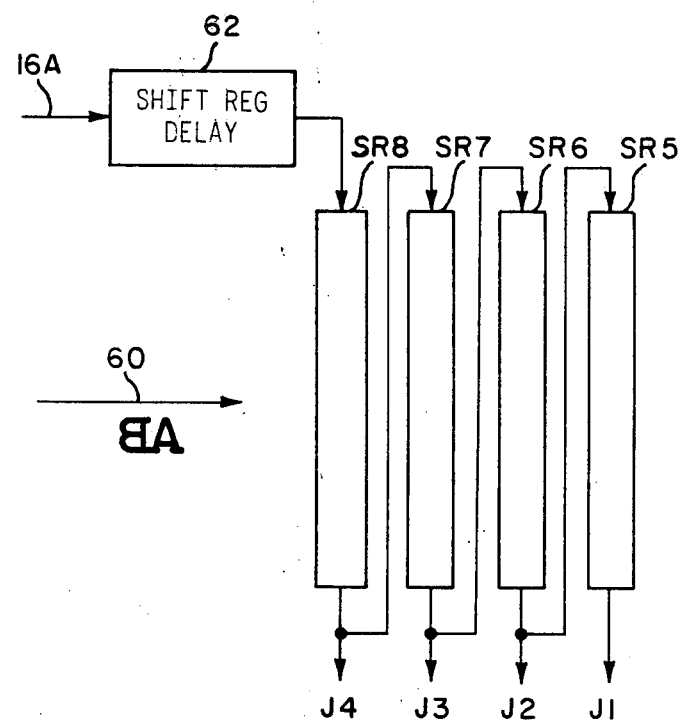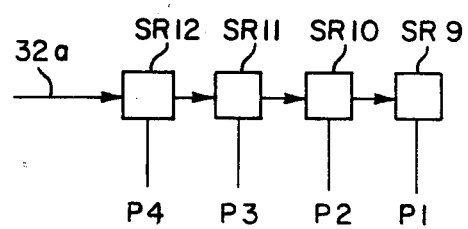
Fig 14a

SEGMENTATION SYSTEM AND METHOD FOR OPTICAL CHARACTER SCANNING

BACKGROUND OF THE INVENTION

The present invention is in the field of data processing, and more particularly, relates to optical character recognition.

Optical character recognition (OCR) systems have been developed to permit entry of textual material on a printed page into a data processing system. Such systems typically require the input text to be composed of symbols having a specially designed type font, where the various symbols-to-be-recognized are positioned on a page in accordance with a well-defined set of rules. The symbols-to-be-entered are defined by regions on the page having an optical characteristic in a first range against a background having an optical characteristic in a second range. For example, the optical characteristic may be reflectivity, and a symbol defined by "black" regions against a "white" background.

For a typical OCR system, a page of text-to-be-entered is initially fed into an optical scanning device where contiguous elemental areas (i.e. picture elements, or pixels) in the text are successively scanned in a raster pattern. A video scan data signal is generated which is representative of the reflectivity of the succession of scanned pixels. The OCR system then processes this digital scan data signal to identify, or recognize, the various characters. This recognition processing generally requires a first step of image segmentation, or identification of data fields containing a single character from the data representative of the line of symbols. Conventionally, the OCR systems rely on "white" space between the characters (horizontally) and beneath the lines of symbols (vertically) for effecting character isolation prior to recognition. Then the isolated character is selectively processed to detect various shape features. A number of optical character feature extraction and recognition techniques are known in the art, such as that disclosed in U.S. Pat. No. 3,930,231. An exemplary system which performs optical character recognition is the Model "Typereader 2" System, manufactured by Hendrix Electronics, Inc., Manchester, N.H.

The "blank scan", or "white swath" (WSW), technique is often used for image segmentation. Generally, vertical regions (or swaths), or two or more adjacent regions, of white space are identified to denote an intercharacter boundary region. This WSW technique is usually adequate for all sans-serif type styles, provided there is sufficient horizontal resolution in the image sensing device. By way of example, the Hendrix Typereader 2 provides intercharacter identification, or segmentation, based on detection of a single white vertical swath (approximately eight mils wide, sampled at 4.7 mil intervals). This is generally adequate since 10 pitch OCR characters typed on 12-pitch have at least a minimum width region of white space between characters. Also, for most purposes, the WSW technique is adequate for any 12-pitch type style (e.g. Courier 12) when typed on 10-pitch.

However, conventional serif type styles (e.g. Courier 12 (at 12-pitch), Courier 72, Prestige Pica, Delegate), have certain characters which occupy full pitch bands. Furthermore, while typewritten character images are nominally centered in the pitch band, in practice, well-aligned typewriters are the exception rather than the rule. The generally encountered mis-alignment results in occasional, and sometimes more than occasional, touching between less than full width characters as well. In such cases, the blank scan, or WSW, segmentation technique is generally inadequate, and more sophisticated segmentation techniques are necessary for machine recognition of characters in such text.

There are a number of segmentation techniques which have been developed into prior art for particular use with complex segmentation problems. These techniques may be referred to by the terms "forced pitch", "blank scan", edge detection", stream following", "recognition feedback", and "post-processing".

The "forced pitch" approach was one of the earliest approaches to segmentation of text having touching characters and utilized a "fly-wheel" approach, where characters were segmented based on a known pitch (e.g. every tenth of an inch). This technique may be adapted for use proportional pitch spacing, for example, with IBM Executive typewriters where the basic pitch varies between two to five increments, depending on the character. For example, see J. Rabinow, "The Present State of the Art and Reading Machine", *Pattern Recognition*, L. Kanal, ed., Thompson Book Company, Washington, D.C. 1968. While this flywheel approach is generally adequate on well adjusted typewriters, it is ineffective where there is character crowding (such as may be due to typewriter misalignment) or where the print quality or sensor optics is sufficiently degraded so that blending of adjacent images occurs. This approach is commonly used in conjunction with one or more of the other segmentation techniques to provide a "last resort" segmentation decision in the event that the other techniques are inconclusive.

The blank scan technique, as is the forced pitch technique, is usually used in conjunction with other procedures. For example, in the blank scan technique, segmentation may be permitted only within a predetermined region, for example, from the midpoint of the pitch band to the end of the pitch band. In U.S. Pat. No. 3,526,876, the WSW approach extends the definition of a blank scan to include a scan containing only one black bit as well. In that patent, segmentation may occur if three such successive scans occur anywhere in the pitch band, or if one such scan is detected in the last quarter of the pitch band (from the start of the character edge detect). A "Serpentine White" technique is a refinement to the basic blank scan technique, whereby non-touching characters can be segmented. This Serpentine White technique requires the detection of a continuous white path (or, "snake") between character images. This snake may be entirely vertical, or may zig-zag from top to bottom of the text stream. This Serpentine technique is effective for separate, and even overlapping, characters. However, it is ineffective with touching characters.

The "edge detection" technique requires detection of features relating to leading edge and trailing edge character information. While not applicable in general, this technique may be "tuned" to a particular font, for example, as suggested by Baumgartner, Beuttner, et al., "Left Side Detection Segmentation", *IBM Technical Disclosure Bulletin*, Vol. 17, No. 2, July, 1974.

A number of relatively easily implementable functions are generally used to indicate leading and trailing edge properties. For example, these functions may typically use arguments of the type:

| | |
|---|---|
| $(B)_i = \Sigma_j B_{i(j)}$ | sum of black bits/swath i |
| $(BB)_{i,i+1} = \Sigma_j B_{i(j)} B_{i+1(j)}$ | sum of adjacent black bits/swath pair |
| $(BW)_{i,i+1} = \Sigma_j B_{i(j)} W_{i+1(j)}$ | sum of adjacent black-white pairs/swath pair |
| $(WB)_{i,i+1} = \Sigma_j W_{i(j)} B_{i+1(j)}$ | sum of adjacent white-black pairs/swath pair |

Segmentation occurs at some extremum (min, max) in the sequence of values over a regime. For example, the $(B_i)$ function may be used to just identify the swath having the fewest (minimum) black pixels as the segmentation points. Variations on this theme include use of alternate columns to form $(BB)_{i,i+2}$, $(BW)_{i,i+2}$ and excluding certain rows from the computation (e.g. top and bottom three rows).

Another class of functions for the edge detection technique is based on contour or profile/height information. For example, top and bottom contours (profiles from above and below) may be used so that the extrema are selected as potential segmentation points.

The "stream following" technique is based on detection of the "ends" of black horizontal regions or "streams", as disclosed in U.S. Pat. No. 4,083,034. In another related approach, the number of streams per swath is tracked, with the resulting sequences then compared against a set of stored patterns for a particular font, as disclosed in Hoffman and McCullogh, "Segmentation Methods for Recognition of Machine Printed Characters", *IBM Journal of Research and Development*, Vol. 15, March, 1971.

The "recognition feedback" technique, as described in U.S. Pat. No. 4,003,023, utilizes a recognition logic network which in effect samples recognition results at uniform intervals, to provide a code sequence consisting of the character codes and reject codes. Groupings of like codes indicate properly aligned characters within a window. For example, if the string result where EEEH**NMMM, the probable character sequence might be EM.

The post-processing technique disclosed by Rosenbaum & Hilliard, "Multifont OCR Post Processing System,", IBM Journal of Research and Development, Vol. 19, No. 4, July, 1975, is designed to deal with:

"horizontal splitting"—division of abnormally wide characters into two pieces (e.g. m→rn)

"catenation"—combination of two characters into one (e.g. rn→m)

"crowding"—excess overlap of two characters, causing truncation of one of the images of the pair.

The basic approach in these cases is to take advantage of a dictionary to correct mis-spelled words.

While each the above techniques known in the prior art do provide some measure of effective segmentation for characters in optical character recognition systems, none of these techniques provide a full and effective approach. One of the principal problems of these prior art approaches is the general characteristic that overlapping characters are processed while, in effect, "throwing away" overlapped portions of the pattern.

It is an object of the present invention to provide an improved segmentation processor and method for use in optical character recognition systems.

SUMMARY OF THE INVENTION

In summary, the present invention provides a system and method for detecting an intercharacter boundary for a digital representation of a string of two or more characters extending in a first direction against a background, where the characters have a first (B) characteristic and said background having a second (W) characteristic. Generally, the digital representation includes a bit for each pixel of an m row by n column array of pixels representative of the string of characters. In accordance with the invention, composite regions are identified for contiguous groups of pixels in two or more adjacent columns bounded above and below by pixels having the W characteristic, where at least one pixel having the B characteristic in each row of each group of pixels has a boundary point in common with a pixel having the B characteristic in each adjacent row of that group. For example, a composite region might include two adjacent BB pixels in a first row and two adjacent underlying BB pixels. The four B pixels of these vertically adjacent pixel pairs have common boundary points along their entire adjacent edges. As a further example, a composite region might include two adjacent WB pixels in a first row and two adjacent underlying BW pixels. The two B pixles of these vertically adjacent pixel pairs have a single common boundary point at the diagonal where the pixels touch. Other pixel configurations may, of course, meet the definition for composite regions.

Simple regions are identified for contiguous groups of pixels in a column having the B characteristic and bounded above and below by pixels having the W characteristic. A serpentine value (SV) signal is generated for each of the n columns of pixels in the array. The SV signal for the $i^{th}$ column, SV(i), is representative of the number of adjacent $i^{th}$ and $i+1^{th}$ column pixel pairs having one or more predetermined patterns (such as BB, BW, or WB) in composite regions which include the $i^{th}$ and $i+1^{th}$ columns and which are contiguous to simple regions in the $i-d^{th}$ and $i+e+1^{th}$ columns, where d and e are integers greater than or equal to 1. By way of example, SV might correspond to the number of such BB pixel pairs. Alternately, SV might correspond to the number of BB and WB pixel pairs, the number of BB and BW pixel pairs, or the number of BW and WB pixel pairs in such regions.

The succession of said SV signals is processed to generate a boundary signal representative of a boundary column, column N, where N is an index representative of the position of the boundary column in the array. The column N is on a predetermined side (e.g. left or right) of the nominal boundary between two of the string of characters.

In some forms of the invention, stream start (SS) signals are generated for some or all of the n columns of pixels in the array. The SS signal for the ith column, SS(i) is representative of the number of regions in the $i+1^{th}$ column which are contiguous to a region in the $i+2^{th}$ through the $i+2+r^{th}$ columns, where r is an integer greater than or equal to 0, and which are contiguous to pixels in said ith column having the W characteristic. In addition, stream end (SE) signals are generated for some or all of the n columns of pixels in the array. The SE signal for the $i^{th}$ column, SE(i), is representative of the number of regions in the $i^{th}$ column which are contiguous to a region in the $i-1-s^{th}$ column through the $i-1^{th}$ column, where s is an integer greater than or equal to 0, and which are contiguous to pixels in the $i+1^{th}$ column having the W characteristic. In this form, the succession of SS and SE values are processed together with the succession of SV values to generate the boundary signal.

Generally, pixels having the B characteristic and near column N are associated with one of the characters adjacent to the identified nominal boundary. In one form, this association is accomplished by identifying contiguous simple regions in the $N+1^{th}$ through the $N+1+f^{th}$ columns which are contiguous to a region in column N, where f is an integer greater than or equal to zero, and where the one of those contiguous regions farthest from column N is contiguous only to pixels having the W characteristic in the next following column. The pixels of those identified regions are associated with a character on one side of column N, and all other pixels having the B characteristic and in the $N-1-g^{th}$ through the $N^{th}$ columns are associated with the character to that one side of the $N^{th}$ column, where g is an integer greater than or equal to zero. In addition, simple contiguous regions are identified in the $N-g^{th}$ through the $N^{th}$ columns for such regions which are contiguous to a simple region in the $N+1^{th}$ column, and where the one of those contiguous regions farthest from column N is contiguous only to pixels having the W characteristic in the next previous column. The pixels of those identified regions are associated with a character on the other side of column N. All other pixels having the B characteristic and in the $N+1^{th}$ through the $N+2+f^{th}$ column are associated with the character to the other side of column N.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 6 shows in schematic form, an exemplary embodiment of the character segmenter of FIG. 3;

FIG. 7 shows the SV, SS and SE values determined by the character segmenter of the system of FIG. 3 for an exemplary string of characters;

FIGS. 14A-14E show in schematic form, an exemplary embodiment of the separation processor of the system of FIG. 13.

DESCRIPTION OF THE PREFERRED EMBODIMENT

Figure 1:
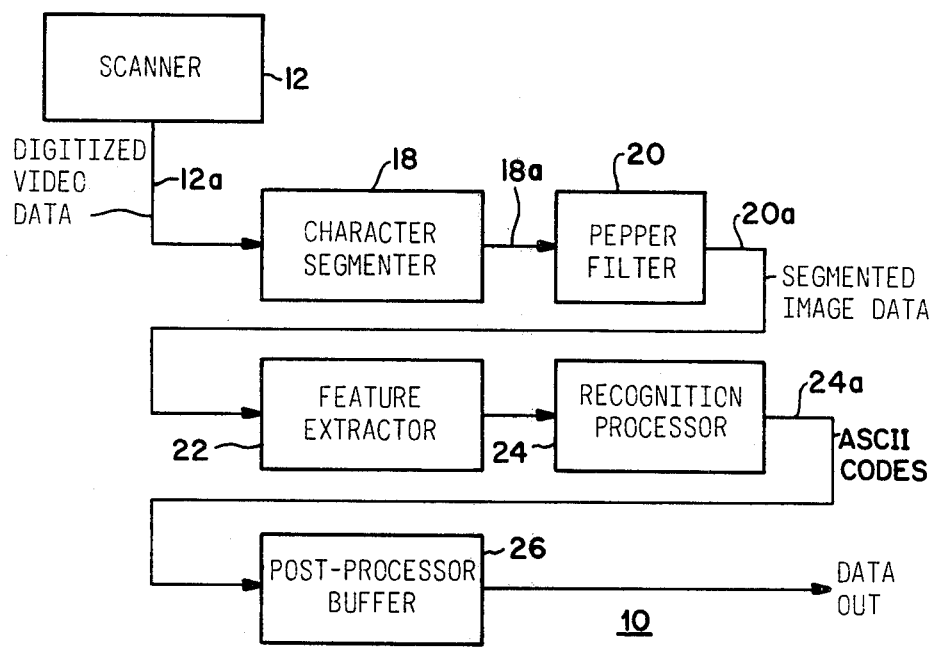
FIG. 1 shows in block diagram form, an exemplary optical character recognition system embodying the present invention.

FIG. 1 shows in block diagram form, an embodiment of the present invention. The system 10 of FIG. 1 includes a scanner 12, character segmenter 18, pepper filter 20, feature extracter 22, recognition processor 24 and post-processor 26. The scanner 12 is a conventional type scanner, including a linear photodiode array for providing a continuous stream of digitized video scan data on line 12a. The scan data is representative of a bottom-to-top vertical raster scan of a line of symbols (or characters) against a background. Generally, the characters have a first optical characteristic (for example, black) and the background has a second optical characteristic (for example, white). The various bits in the video scan data are representative of correspondingly positioned pixels in the image being scanned. In the present embodiment, a bit has a binary 1 value for pixels having a black (B) characteristic and a binary 0 value for characters having a white (W) characteristic. In alternate but equivalent embodiments, the B pixels may be 0 and the W pixels may be 1.

Figure 2A:
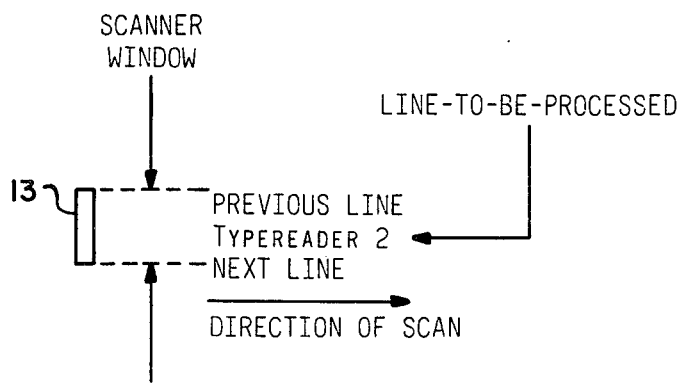
FIG. 2A illustrates the scanner sensor of the embodiment of FIG. 1 together with an example of text-to-be-scanned.
Figure 2B:
FIG. 2B illustrates in digitized format, a portion of the text-to-be-scanned of FIG. 2.
Figure 2C:
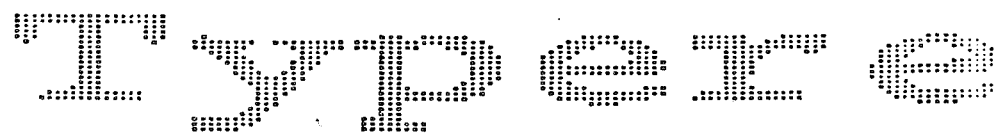
FIG. 2C illustrates in digitized format the masked scan data corresponding to the text-to-be-scanned of FIG. 2A.

FIG. 2A shows an exemplary linear photodiode array 13 ($64 \times 1$ cell), in conjunction with three lines of symbols in an image-to-be-scanned. FIG. 2B shows an exemplary digitized pattern resulting from scanning a portion of the lines of symbols shown in FIG. 2A. In the present invention, the scanner 12 includes conventional circuitry necessary to mask the array output so that only a single line of characters is represented in the digitized video data on line 12a. FIG. 2C shows a digitized m row (X-direction) by n column (Y-direction) array representative of the masked scanned data which is provided on line 12a.

The digitized video data signal from scanner 12 is applied by way of line 12a to character segmenter 18. The character segmenter 18 provides segmentation of the various bits of the data applied on line 12a. The character segmenter 18 associates each of the bits of the data from lines 12a with a single character, and provides a succession of data sequences on line 18a where each data sequence is associated with a single character.

The pepper filter 20 is a conventional pepper filter which "cleans up" isolated spots and ragged edges of the individual characters for each of the data sequences which are provided by the segmenter 18. The segmented image data on line 20a is applied to feature extracter 22. The feature extracter 22 and recognition processor 24 may operate in a conventional manner, for example, first extracting shape features from the segmented character data and then processing those features to identify the various characters, based on a "table look-up" of features, for example, in the manner described in U.S. Pat. No. 3,930,231. The recognition processor 24 provides output signals on line 24a in the form of ASCII codes which are representative of the characters extracted from the character data signal.

Figure 3:
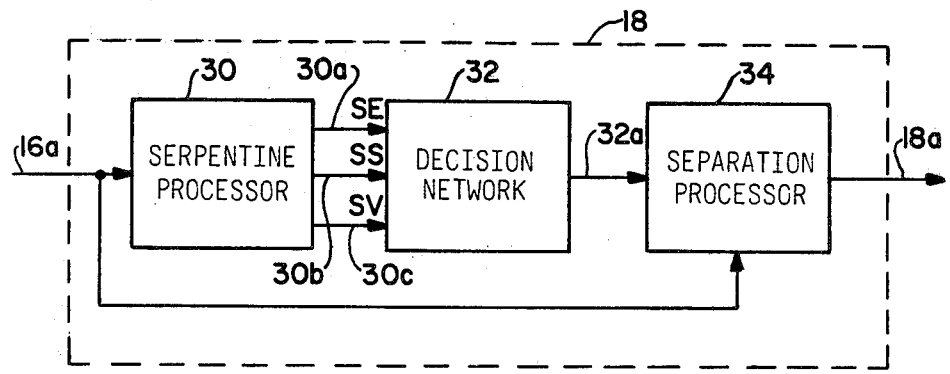
FIG. 3 shows in block diagram form, the character segmenter of the system of FIG. 1.

An exemplary form of the character segmenter 18 is shown in block diagram form in FIG. 3. The character segmenter 18 includes a serpentine processor 30, a decision network 32 and a separation processor 34. In the present embodiment, image scanning is accomplished from left to right, resulting in a digitized sequence of 64 bit (Y-direction) data swaths (or columns) which are stored in a memory (for example, a random access memory (RAM) or a shift register (SR)). These swaths are accumulated in the memory to form a two-dimensional digitized image in the form of an m row by n column (m×n) array of bits. The serpentine processor 30 provides a four-swath window (or filter) which is shifted left-to-right across the masked character data, as stored in the memory. In other embodiments, different numbers of swaths may be used in the window.

Figure 4:
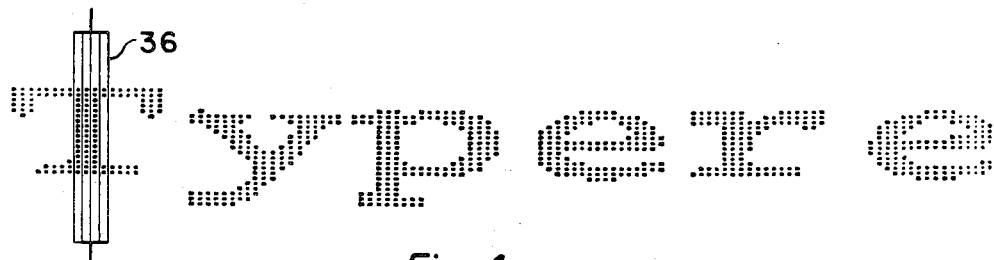
FIG. 4 illustrates the serpentine window for the character segmenter of FIG. 3 at a point in the line of text of FIG. 2C.

For various window positions (with respect to the m×n array) the processor 30 operates on the stored image within the window to produce a "figure-of-merit" or serpentine value, SV, associated with segmenting (i.e. defining an intercharacter boundary of) the image between columns 2 and 3 of the window at the current position. FIG. 4 shows an exemplary four-swath window 36 in conjunction with the masked digitized image illustrated in FIG. 2C.

Within a current swath in the window 36, processor 30 identifies contiguous strips of "black" bits in the swath, bounded on top and bottom by "white" bits as "regions". In various forms of the invention, the regions may be further classified as "simple" (for such contiguous strips which occur in a simple swath) and "composite" (for sets of pixels formed by the union or intersection of touching contiguous strips which occur in adjacent columns). In the present embodiment, processor 30 also identifies "stream starts" (SS's) and "stream ends" (SE's) in the current swath. A stream start is defined to occur in a swath for an identified region which extend at least through the next swath and which has no horizontally adjacent black bits in the next previous swath. A stream end is defined to occur in a swath for an identified region which has continued for at least one previous swath and which has no horizontally adjacent black bits in the next following swath. Other embodiments may employ somewhat different definitions for stream starts and ends for a current swath, such as requiring a stream start to include a region extending through more than one following swath, and requiring a stream end to include a region which has continued through more than one previous swath.

Figure 5:
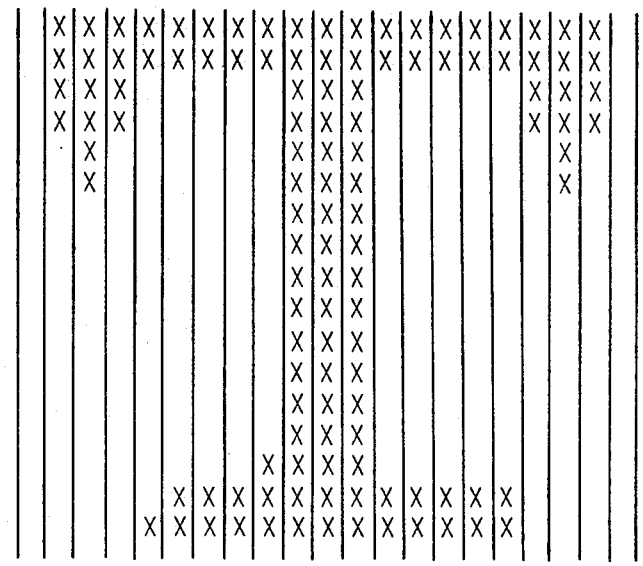
FIG. 5 illustrates a character in the line of text of FIG. 2C together with characteristic values associated with the character segmenter of FIG. 3.

FIG. 5 shows the character "T" along with vetical lines separating the swaths. Under each swath, FIG. 5 shows values determined by processor 30, including the number of regions present in each swath position, along with the number of stream starts and stream ends for each of the swaths. Processor 30 uses the identified regions to determine a segmentation value (SV) for the current swath. Processor 30 provides signals on lines 30a–c representative of SS, SE, and SV, respectively, for various swath positions. In the present embodiment, these values are only provided for a predetermined range of swath positions for which segmentation is permitted to occur. For example, for 10 pitch, serifed type, values are provided only for swath positions 17–23 for each character. For other embodiments, other allowed segmentation ranges may be used.

In operation, in the present embodiment, the serpentine processor 30 performs a logical OR operation for the second and third swaths of the four-swath window 36. For each of the regions determined by the resultant pattern (of that logical OR step) which are contiguous from columns 1 to 4 (i.e. there are no stream starts or ends in columns 2 or 3), the processor 30 determines the sum of the adjacent black bit pairs, BB, between columns 2 and 3. Processor 30 generates a serpentine value signal SV representative of the sum of all the BB's over all such regions.

In an alternate embodiment, the serpentine processor may substitute a logical AND operation for the above noted logical OR operation to generate the nominal swath i region used as a basis for the subsequent processing. In yet other embodiments, the swath i regions may be determined only from swath i pixels. Moreover, in all of these various embodiments, the SV may alternately be determined from the sum of the BB $i^{th}$ and $i+1^{th}$ swath pixel pairs (as in the illustrated embodiment) plus the sum of the number of WB or BW, or both, $i^{th}$ and $i+1^{th}$ swath pixel pairs.

In the present embodiment, the processor 30 further provides a Stream End (SE) signal which is representative of the number of stream ends which span columns 1 and 2 only, i.e. at the end of column 2. Similarly, the processor 30 provides a Stream Start (SS) signal representative of the number of stream starts which span columns 3 and 4 only, i.e. start at column 3.

FIG. 6 shows an exemplary hardware implementation of the serpentine processor 30 for the preferred embodiment. It wil be understood that the details of timing and initialization circuitry are not shown and may be readily provided.

FIG. 7 shows the sequence of values for the SE, SS and SV signals determined by the serpentine processor 30, as an image "WG" (having overlapping portions) moves through the four-swath window. In that figure, an "X" in the SV data denotes a value greater than or equal to ten for the serpentine value. In FIG. 6, the serpentine processor 30 operates in conjunction with the 64-bit sensor of scanner 12. A four swath serpentine shift register 40 includes four serially connected 64-bit shift registers, denoted SR1–SR4. The masked video scan data is serially clocked into SR4 by a series of uniformly spaced timing (or clock) pulses. Signal lines S1–S4 are provided from the output ends of the respective shift registers SR1–SR4. With this configuration, the text image-being-scanned effectively translates from right to left (with respect to registers SR1 through SR4, as shown) as indicated by arrow 42 for the exemplary image shown in FIG. 6 by the characters "AB". The remainder of serpentine processor 30 includes the illustrated configuration of AND gates 41–43 and OR gate 48 (coupled to various ones of lines S1 through S4, and an interconnected network of AND gates 44–46, a NAND gate 49, flip-flops FF1–FF5 (type 7474), counters C1–C3 and an accumulator A1. A timing circuit (not shown) provides a strobe pulse halfway between the shift pulses for the register 40. With this configuration, a four bit horizontal sensor is in effect successively moved from bottom to top of the window 36. As this movement takes place, regions (and their starts and ends) are detected and the serpentine value (SV) is determined. The counter 52 provides the SE signal on line 30a representative of the number of stream ends in a swath, the counter 54 provides the SS signal on line 30b representative of the number of stream starts in a swath, and the accumulator 56 provides the SV signal on line 30c representative of the serpentine value for the swath.

In the present embodiment, the serpentine value and stream start and stream end values are provided by the hardware shown in FIG. 6. However, in alternative systems, a general purpose digital computer (such as a DEC PDP11/34 using the RSX Operating System) may be programmed in accordance with the programs shown in Appendix A to provide SV, SS and SE signals representative of these values (adapted to handle 32 bit swaths).

The decision network 32 may also take the form of a programmed general purpose computer, for example, a DEC PDP11/34 using the RSX Operating System and having the program as shown in Appendix B. Generally, decision network 32 identifies a nominal inter-character boundary position (column N), depending on the pitch and typestyle selected. A boundary signal representative of this identified nominal boundary (column N) is provided on line 32a and applied to separation processor 34.

Figure 8:
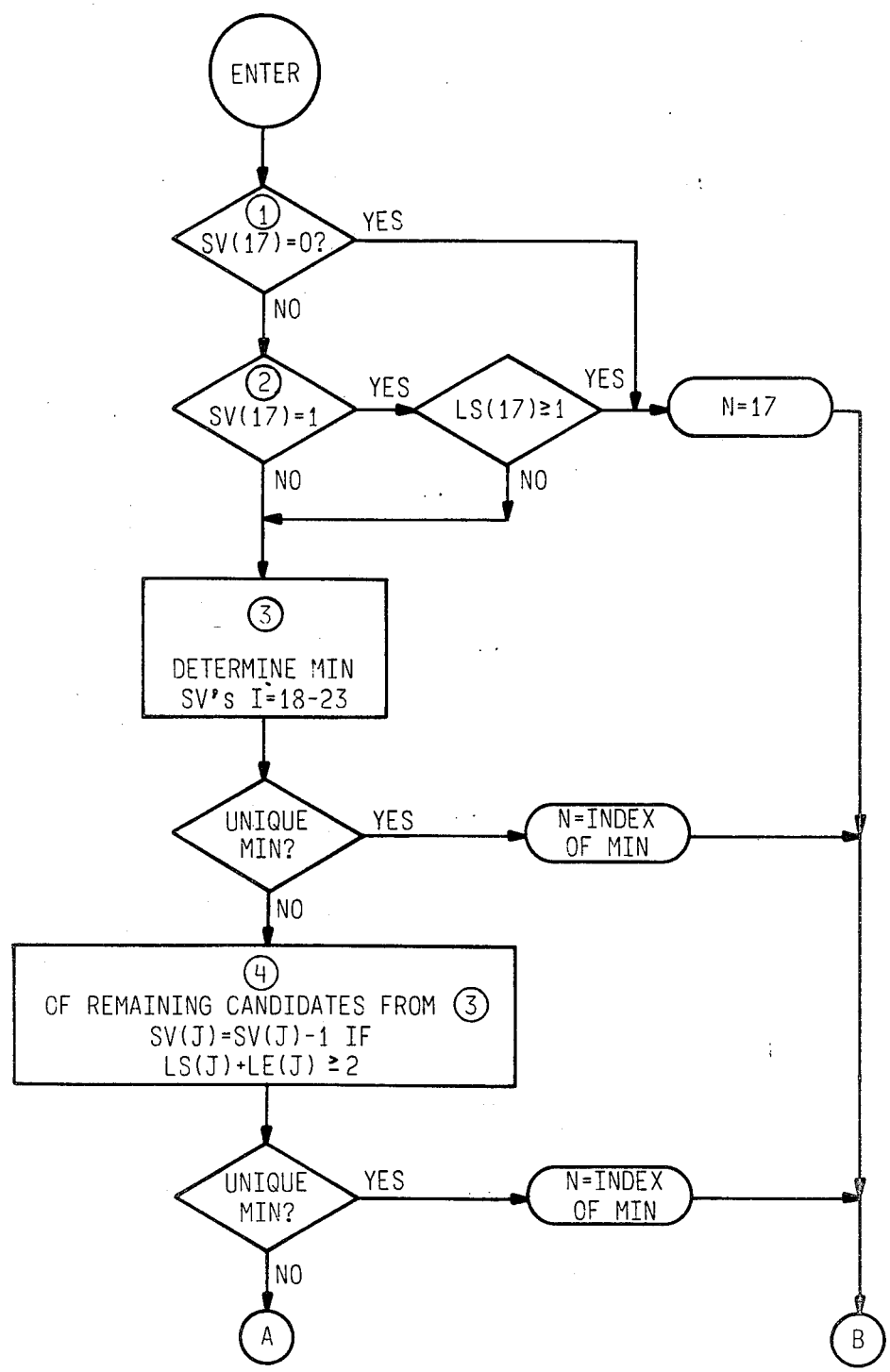
FIGS. 8-9, FIGS. 10-11, and FIGS. 12-13 illustrate in flow chart form, the operation of the decision network of the system of FIG. 3.
Figure 9:
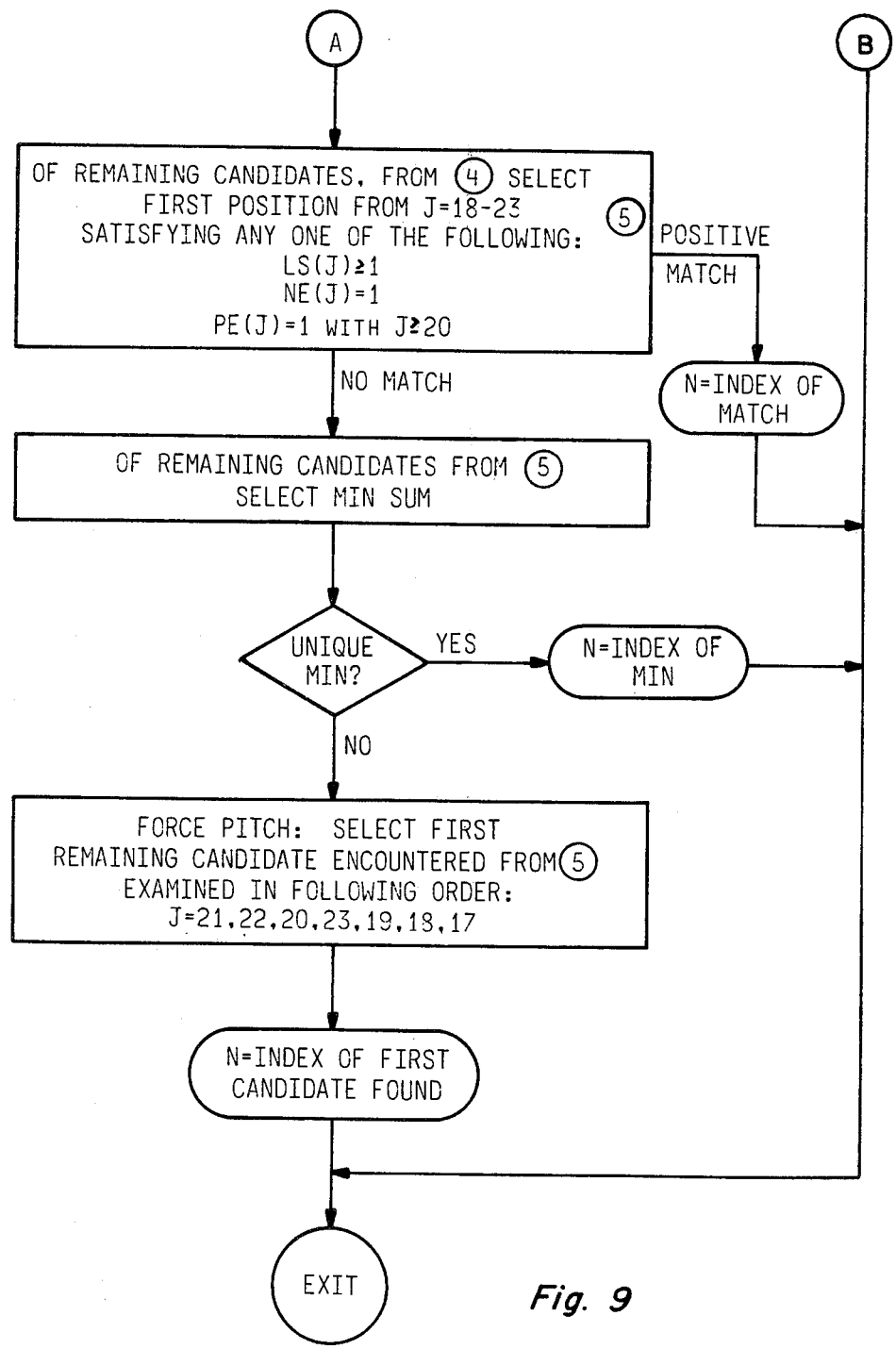
Figure 10:
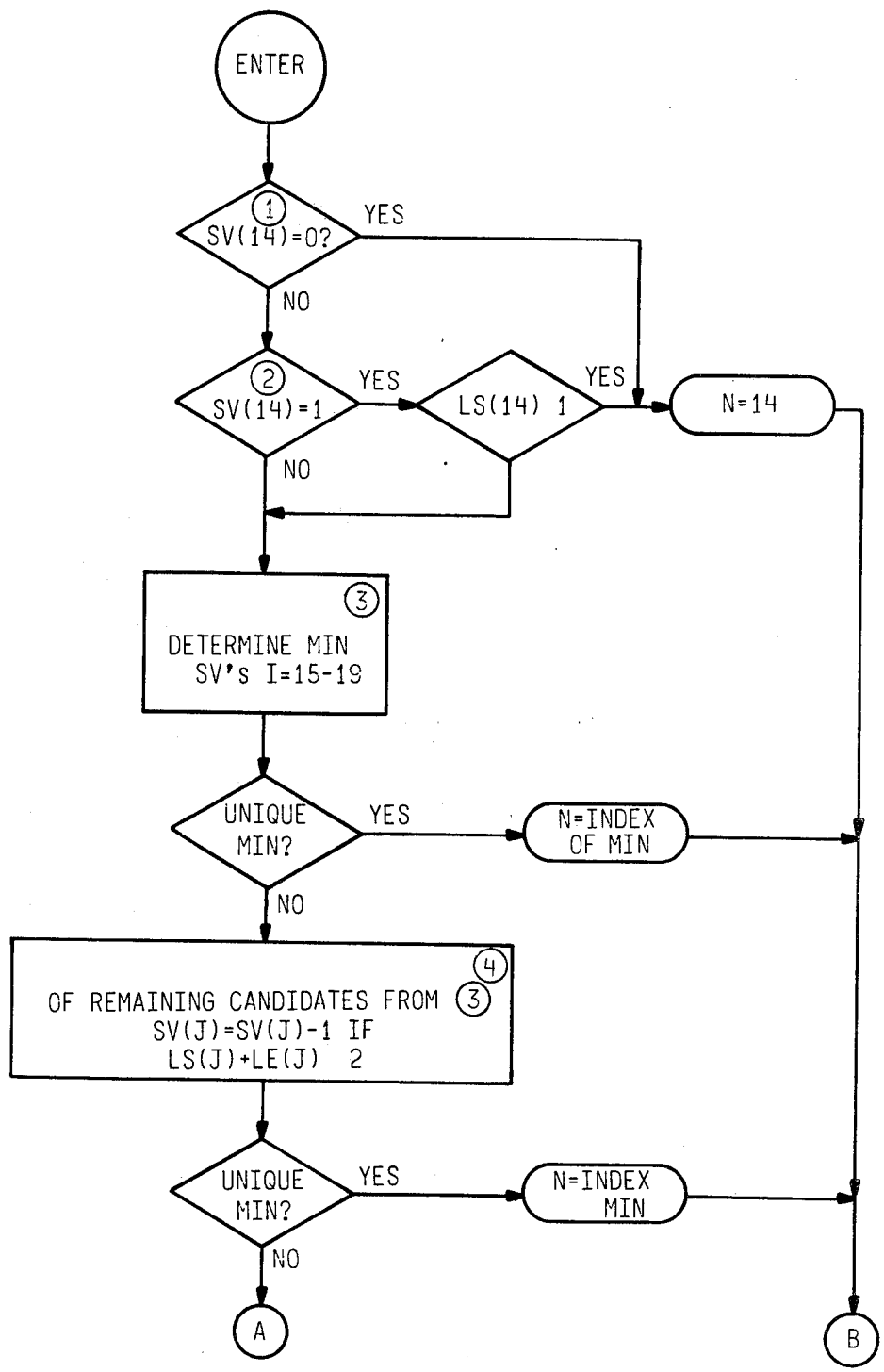
Figure 11:
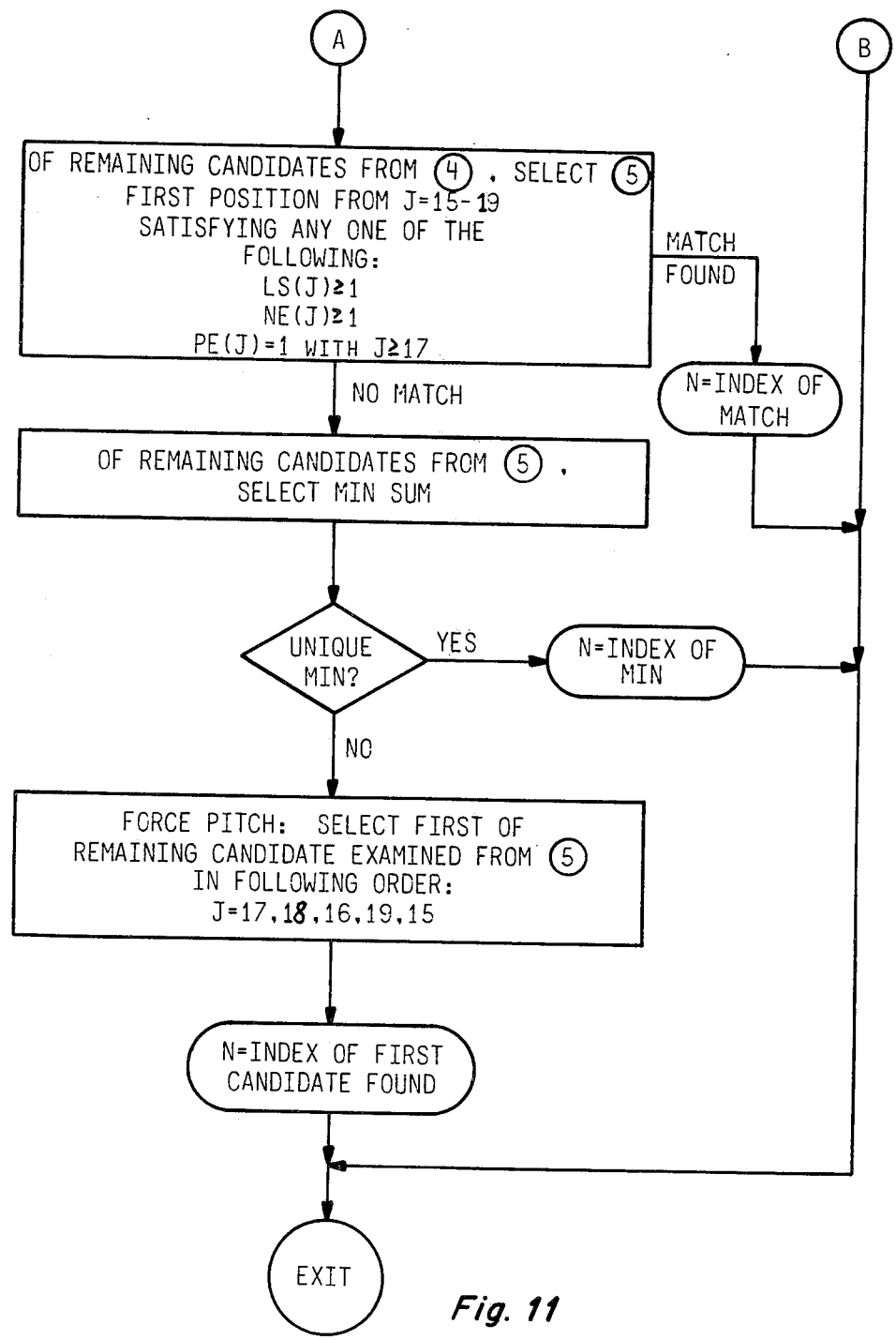
Figure 12:
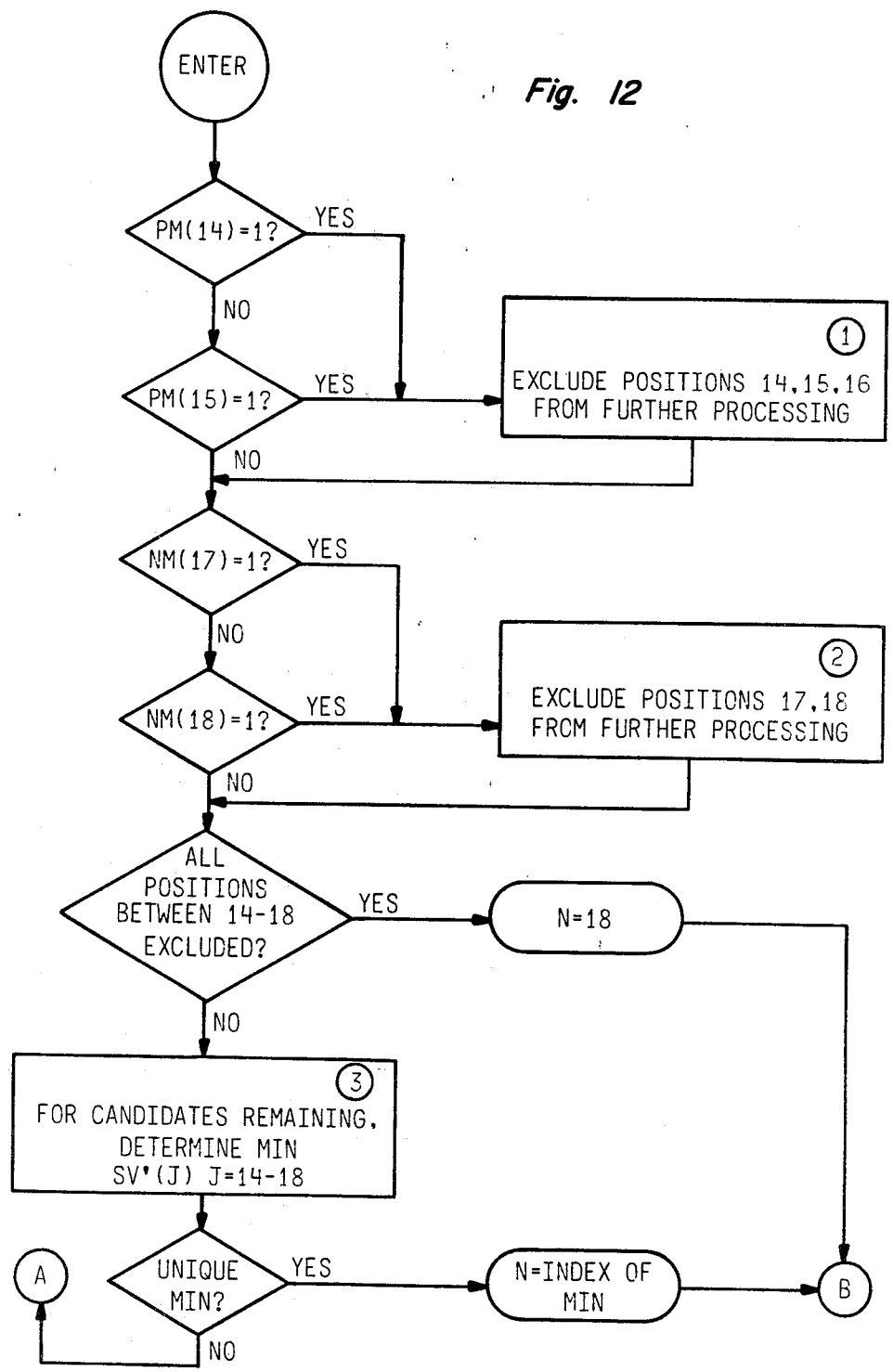
Figure 13:
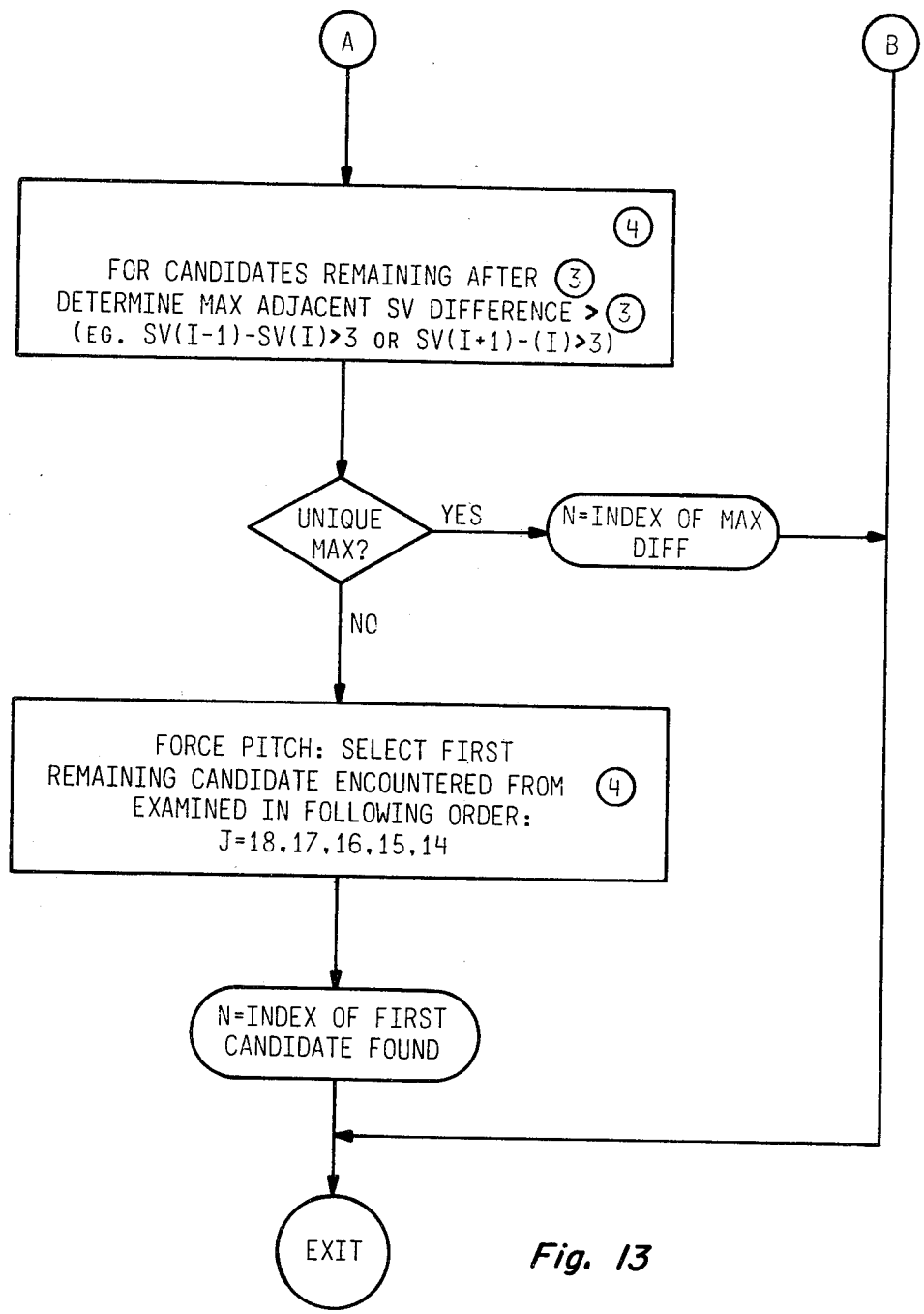
Figure 14B:
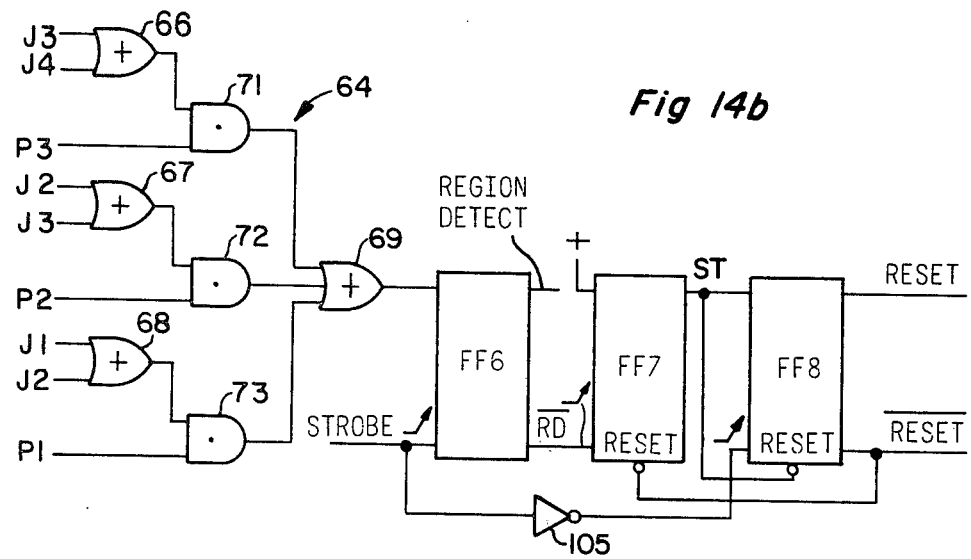
Figure 14C:
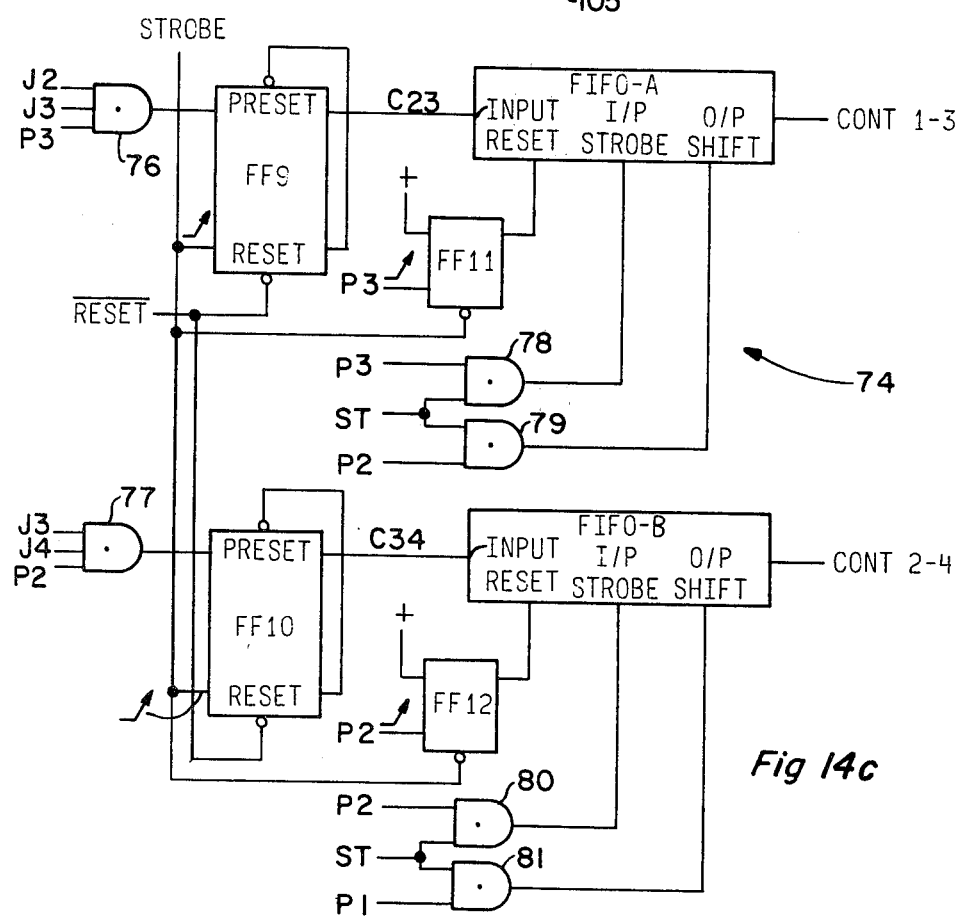
Figure 14D:
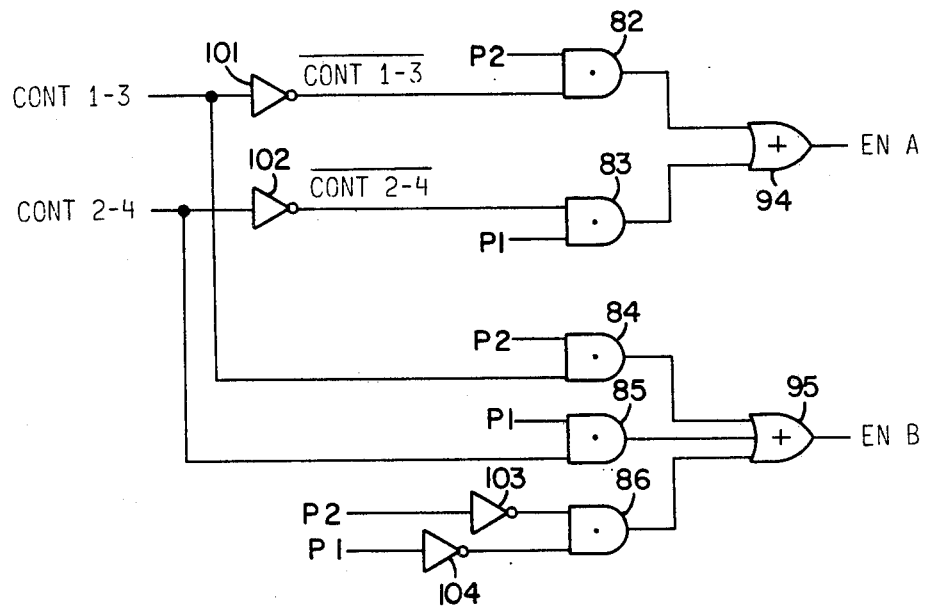
Figure 14E:
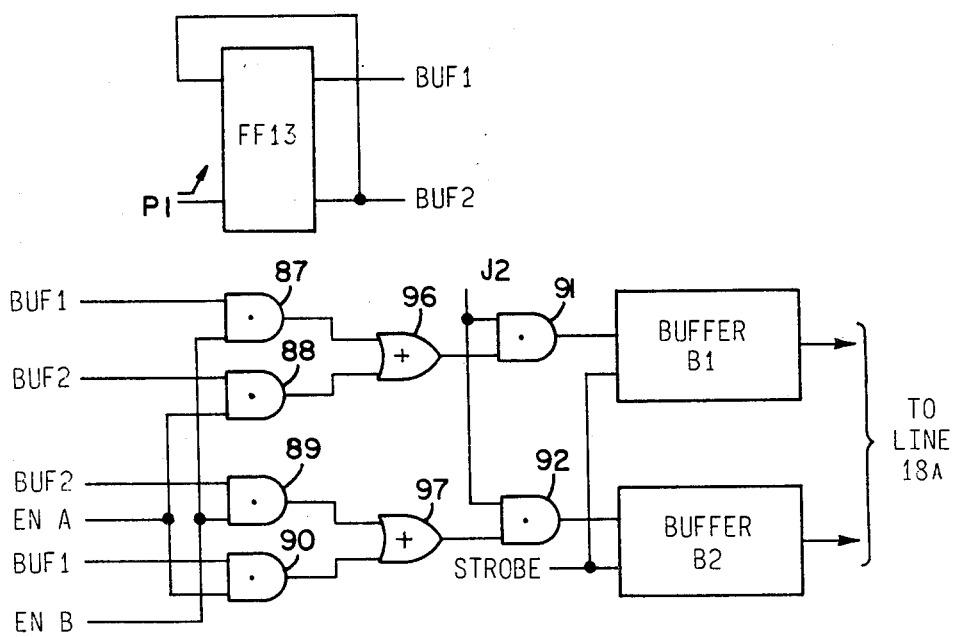

In keeping with the present invention, the segmentation position is selected to be the optimal position within a predetermined range of allowed boundaries, depending on the pitch selection, and using only the succession of SV values (and various functions of those values) determined by the serpentine processor 30, and in some cases also using the SS and SE values determined by processor 30. By way of example, FIGS. 8 and 9 show an exemplary segmentation flow chart for segmentation decisions for 10-pitch serifed typestyles, and FIGS. 10 and 11 show an exemplary segmentation flow chart for 12-pitch, serifed typestyles. The systems of FIGS. 8-11 use the SV, SS and SE values. FIGS. 12 and 13 show an exemplary segmentation flow chart for 12-pitch, non-serifed typestyles. The system of FIGS. 12-13 uses only the SV values. In the system of FIGS. 8 and 9, the allowable range for segmentation is 17-23, in that of FIGS. 10 and 11, the allowable range for segmentation is 14-19, and in that of FIGS. 12 and 13, the allowable range for segmentation is 14-18. In these figures, the value N is representative of the index of the swath determined to be the nominal boundary.

In the systems of FIGS. 8-13, the following exemplary functional definitions are used:

$SV(i)$ - serpentine value
$SE(i)$ - no. of stream ends
$SS(i)$ - no. of stream starts
$NE(i)$ - next edge detect where for the four swath window positioned with column $2=i$ $$NE(i) = \begin{cases} 1 & \begin{cases} SV(i+3) \geq 11, SV(i+1) \leq 6 \text{ (10 pitch)} \\ SV(i+3) \geq 9, SV(i+2) \leq 5 \text{ (12 pitch)} \end{cases} \\ 0 & \text{OTHERWISE} \end{cases}$$

$PE(i)$ - previous edge detect where $$PE(i) = \begin{cases} 1 & \begin{cases} SV(i-4) \geq 11, SV(i-3) \leq 6 \text{ (10 pitch)} \\ SV(i-3) \geq 9, SV(i-2) \leq 5 \text{ (12 pitch)} \end{cases} \\ 0 & \text{OTHERWISE} \end{cases}$$

$SUM(i)$ - defined as
$SUM(i) = SV(i-1)+SV(i)+SV(i+1)$
$NM(i)$ - "next character = m" detect where $$MN(i) = \begin{cases} 1 & \begin{cases} \text{if } 2 \leq SV(i) \leq 4 \\ \text{and } SV(i+5) \geq 12 \\ \text{and } SV(i-2) \geq 12 \end{cases} \\ 0 & \text{OTHERWISE} \end{cases}$$

$PM(i)$ - "previous character = m" detect where $$PM(i) = \begin{cases} 1 & \begin{cases} \text{if } 2 \leq SV(i) \leq 4 \\ \text{and } SV(i-5) \geq 12 \\ \text{and } SV(i+2) \geq 12 \end{cases} \\ 0 & \text{OTHERWISE} \end{cases}$$

Of course these functions are merely exemplary and other functions, and variations thereof, may be used in alternative embodiments.

The separation processor 34 includes a sub-system in part similar in function to that in the serpentine processor 30. Generally, processor 34 first re-applies the serpentine value procedure at the separation position (column N) determined by decision network 32. The second step of the separation processor operation consists of dividing each region according to the following:

(1) All points touching a region with Stream End in column 3 go to a first image stack (character) buffer B1;

(2) All points touching a region with Line Start in column 2 go to a second image stack (character) buffer B2;

(3) All remaining points in columns 1 and 2 go to buffer B1; and (4) All remaining points in columns 3 and 4 go to buffer B2.

FIGS. 14A-14E show an exemplary hardware configuration for the separation processor 34. Generally, the processor 34 includes a shift register delay element 62, four 64-bit serially connected shift registers (denoted SR5-SR8) and having output signal lines J1-J4, respectively), four single bit series connected shift registers (denoted SR9-SR12 and having output signal lines P1-P4, respectively), all shown in FIG. 14A. As shown in FIGS. 14B-14E, processor 34 further includes AND gates 71-73 and 76-92, OR gates 66-69 and 94-97, flip-flops FF6-13, inverters 101-105, FIFO registers FIFO-A and -B, and image stack buffers B1 and B2.

In operation, the masked scan data from line 12a is serially clocked into the first shift register SR8, and then to shift registers SR7, SR6 and SR5, at the system clock rate so that the image motion is as illustrated by arrow 60 in FIG. 14A. In the present embodiment, the boundary signal on line 32a has the form of a flag bit, and is synchronized with the delayed form of the masked scan data on line 62a. This flag bit is shifted through the shift registers SR9-SR12 in response to a shift signal which occurs at 1/64 of the system clock rate.

In operation, the masked scan data is ready for separation when segmentation position indicator (i.e. flag signal on line 32a) reaches register P2. Initially, FIFO A is cleared (by its reset input) at the leading edge of P3. During each ST pulse (generated at the trailing edge of RD (or leading edge of $\overline{RD}$) while P3 is binary 1), the state of C23 is strobed (by its input strobe) into FIFO A. At the beginning of P2 interval, $CONT_{1-3}$ assumes the state of the first entry strobed into the FIFO during the P3 interval. At each succeeding ST pulse during P2, the FIFO is shifted resulting in the next FIFO entry being available on $CONT_{1-3}$. FIFO-B operation proceeds in a similar manner.

For the first character in a line, the data from signal line J2 is gated to the first image stack buffer to store pixel data representative of the first character. Generally, the data from J2 continues until the segmentation position indicator reaches register SR10, as indicated by the flag on line P2. In response to the detection of a "stream start" (i.e. no intersection with a region in column 1), the associated pixel data from line J2 is entered in buffer B2. When the segmentation position indicator apears on line P1, the data from J2 normally is routed to the second buffer B2. In response to the detection of a "stream end" (i.e. no intersection with a region in column 4), the associated pixel data from J2 is entered into buffer B1. This process now repeats, with the roles of buffers B1 and B2 reversed.

The character pixel data from buffers B1 and B2 may be alternately accessed and applied to line 18a, as required. The above function repeats for successive characters in the masked scan data.

Figure 15:
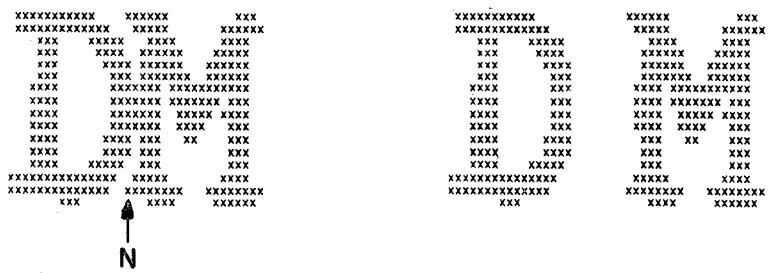
FIGS. 15-17 illustrate the separation of adjacent characters performed by the system of FIG. 3.
Figure 16:
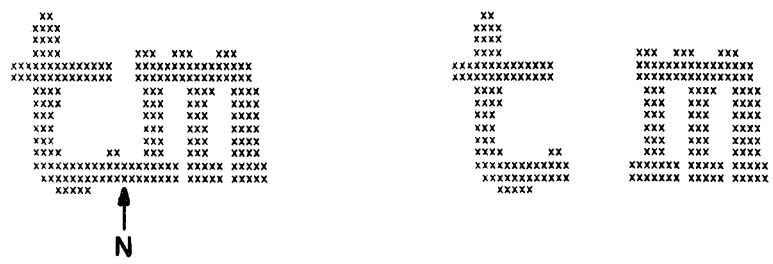
Figure 17:
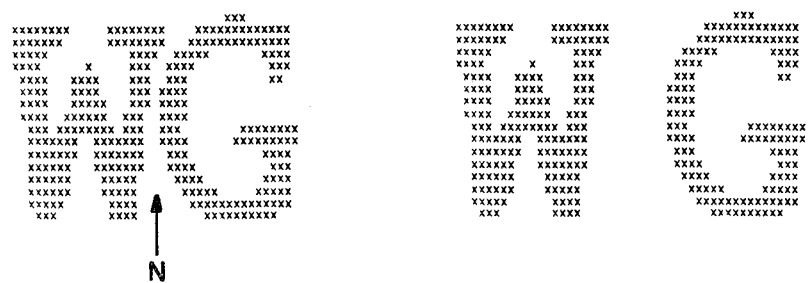

FIGS. 15-17 show three illustrations of characters and how they are segmented by the system of FIGS. 1-14E. In these figures, the nominal boundary (column N) is denoted by an arrow. More particularly, FIG. 15 shows Prestige Elite, 12-pitch having touching characters with overlap, FIG. 16 shows Prestige Pica, 10-pitch having touching characters without overlap, and FIG. 17 shows Courier 12, 10-pitch having non-touching characters with overlap.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX A

```
0001          SUBROUTINE ISERP(ICOL,IRET)
       C +***********************************************************
       C NAME: ISERP
       C PURPOSE: COMPUTE ISV, THE SERPENTINE SEPARATION VALUE, FOR SEGMENTATION
       C          BETWEEN COLS 2 AND 3 OF 4 COLUMN PATTERN
       C ARGUMENTS:
       C     ICOL----4 COLUMN, 32-BIT/COL DATA PATTERN
       C     IRET----4 WORD RETURN VECTOR WHERE
       C          IRET(1)=ISV=SEPARATION VALUE
       C          IRET(2)--NOT USED IN THIS ROUTINE
       C          IRET(3)=LE=# LINE ENDS
       C          IRET(4)=LS=# LINE STARTS
       C          ISV=99 IF TOO MANY REGIONS (OVERFLOW ERROR)
       C INPUTS IN COMMON:
       C     MASK----16 WORD BIT MASK; MASK(I) HAS BIT 'I'=1, LSB=(I=1)
       C THE ALGORITHM APPROACH:
       C     SEPARATION VALUE(ISV)--# OF ADJACENT BLACK BITS IN COL'S 2&3
       C          WHOSE REGIONS SPAN ALL 4 COLUMNS. (A REGION IS
       C          DETERMINED AS A CONTIGUOUS BLACK PATTERN IN THE
       C          COLUMN CREATED BY 'OR-ING' COLS 2&3).
       C     LINE ENDS(LE)--REGIONS OF BLACK SPANNING COLS 1&2 ONLY.
       C     LINE STARTS(LS)--REGIONS OF BLACK SPANNING COLS 3&4 ONLY.

C -***********************************************************
0002          INTEGER ICOL(2,4),IRET(6)
0003          COMMON /MSK/MASK
0004          INTEGER *2 RFLAG(4,5),INT(2,4),MASK(16)
       C
       C INITIALIZE CONSTANTS, FLAGS, ETC.
       C
0005          INC=0              !REGION FLAG, 0=WHITE, 1=REGION PRESENT
0006          IR=0               !REGION LABEL (1,2,3,4,5)
0007          DO 10 J=1,5
0008          DO 10 I=1,4
0009    10    RFLAG(I,J)=0
0010          DO 15 J=1,6
0011    15    IRET(J)=0
       C
       C SET UP REGIONS
       C
0012          INT(1,4)=ICOL(1,2).OR.ICOL(1,3)
0013          INT(2,4)=ICOL(2,2).OR.ICOL(2,3)
       C
       C SET UP INTERSECTS
       C
0014          DO 20 I=1,3
0015          DO 20 J=1,2
0016    20    INT(J,I)=ICOL(J,I).AND.ICOL(J,I+1)
       C
       C PROCESS REGIONS
       C
0017          DO 50 L=1,2
0018          DO 50 K=1,16
0019          IF(INT(L,4).AND.MASK(K)) 30,40,30    !REGION PRESENT?
0020    30    IF(INC.NE.0) GO TO 31
0022          INC=1
0023          IR=IR+1
0024          IF(IR.GT.5) GO TO 100                !TOO MANY REGIONS
```

```
0026  31      DO 35 I=1,4
0027          IF(INT(L,I).AND.MASK(K)) 32,35,32
0028  32      RFLAG(I,IR)=RFLAG(I,IR)+1
0029  35      CONTINUE
0030          GO TO 50
0031  40      INC=0
0032  50      CONTINUE
      D       PRINT 4000, IBGN,INT
      D4000 FORMAT(' IBGN= ',I3,2X,'INT= ',8010)
      D       PRINT 4002,RFLAG
      D4002 FORMAT(' RFLAG= ',5(/,8X,4I5))
      C
      C   DETERMINE SEPARATION VALUE
      C
0033          IC=0
0034          LE=0
0035          LS=0
0036          DO 60 I=1,IR
0037          IF(RFLAG(1,I)*RFLAG(2,I)*RFLAG(3,I).NE.0) IC=IC+RFLAG(2,I)
0039          IF(RFLAG(1,I).NE.0.AND.RFLAG(2,I)+RFLAG(3,I).EQ.0) LE=LE+1
0041          IF(RFLAG(1,I)+RFLAG(2,I).EQ.0.AND.RFLAG(3,I).NE.0) LS=LS+1
0043  60      CONTINUE
      C
      C   UPDATE RETURN VECTOR
      C
0044          IRET(1)=IC
0045          IRET(2)=0
0046          IRET(3)=LS
0047          IRET(4)=LE
0048          RETURN
0049  100     IRET(1)=99         !TOO MANY REGIONS
0050          RETURN
0051          END
```

APPENDIX B

```
0001          SUBROUTINE ALG9(IOUT,N,LC,IPTCH)
      C +***********************************************************
      C NAME: ALG9
      C PURPOSE: SELECT TC SEGMENTATION POSITION FROM ANALYSIS OF SV DATA
      C ARGUMENTS:
      C     IOUT(1,I)=COLUMN SEPARATION POSITION(17-23 FOR 10 PITCH,
      C                                          14-19 FOR 12 PITCH
      C     IOUT(2,I)=ISV=SEPARATION VALUE FOR POSITION IN IOUT(1,I)
      C     IOUT(3,I)=RETURN ARG FOR LEADING OR TRAILING EDGE DETECT
      C     IOUT(4,I)=# LINE STARTS
      C     IOUT(5,I)=# LINE ENDS
      C     IOUT(6,I)=RETURN ARG FOR SUM OF SV'S AT I-1,I,I+1
      C     N=# OF SV'S
      C     LC=RETURN DECISION INDEX,  IOUT(1,LC)=SEPARATION POSITION
      C     IPTCH=PITCH (10 OR 12)
      C SUBROUTINES CALLED:
      C     MINVAL
      C     BEST
      C
      C -***********************************************************
0002          DIMENSION IOUT(7,15),INV(15,7),IRET(15)
0003          IED10(IX,IY)=(IX/11)*(7/(IY+1))         !IX.GE.11,IY.LE.6
0004          IED12(IX,IY)=(IX/9)*(6/(IY+1))          !IX.GE.9,IY.LE.5
      C
      C   SET UP SUM DATA
      C
0005          DO 2 J=2,N-4
0006  2       IOUT(6,J)=IOUT(2,J-1)+IOUT(2,J)+IOUT(2,J+1)
      C
      C   SET UP LEADING AND TRAILING EDGE DATA
      C
0007          IF(IPTCH.EQ.12) GO TO 7
0009          DO 5 I=1,N-4
0010          IOUT(3,I)=0
```

```
0011            NTE=IED10(IOUT(2,I+3),IOUT(2,I+1))
0012            NLE=IED10(IOUT(2,I-4),IOUT(2,I-3))
0013            IF(NTE.GE.1) IOUT(3,I)=1
0015            IF(IOUT(1,I).GE.20.AND.NLE.GE.1) IOUT(3,I)=IOUT(3,I)+1
0017    5       CONTINUE
0018            GO TO 9
0019    7       DO 8 I=1,N-4
0020            IOUT(3,I)=0
0021            NTE=IED12(IOUT(2,I+3),IOUT(2,I+2))
0022            NLE=IED12(IOUT(2,I-3),IOUT(2,I-2))
0023            IF(NTE.GE.1) IOUT(3,I)=1
0025            IF(IOUT(1,I).GE.17.AND.NLE.GE.1) IOUT(3,I)=IOUT(3,I)+1
0027    8       CONTINUE
0028    9       CONTINUE
        C
        C TEST POSITION 1 FOR SV=0 OR SV=1 AND LS=1; IF SO SET LC=1
        C
0029            LC=0
0030            IF(IOUT(2,1).EQ.0.OR.IOUT(2,1).EQ.1.AND.IOUT(4,1).GE.1)
               1 LC=1
0032            IF(LC.EQ.1) RETURN
        C
        C  DETERMINE MIN ISV'S BETWEEN IBGN+1 AND IEND-3
        C  RETURN WHEN NLC=1 (UNIQUE ENTRY)
        C
0034            DO 10 I=1,6
0035            DO 10 J=1,15
0036    10      INV(J,I)=IOUT(I,J)
0037            CALL MINVAL(INV(1,2),N,IRET,LC,NLC) !SELECT MIN SV'S
0038            IF(NLC.EQ.1) RETURN
        C
        C  FOR MIN ISV'S, SUBTRACT 1 IF #LS+#LE.GE.2; TEST IF UNIQUE
        C
0040            DO 20 J=1,N
0041            IF(IRET(J).EQ.1.AND.IOUT(4,J)+IOUT(5,J).GE.2)
               1    INV(J,2)=INV(J,2)-1
0043    20      CONTINUE
0044            CALL MINVAL(INV(1,2),N,IRET,LC,NLC)
0045            IF(NLC.EQ.1) RETURN
        C
        C  FOR THOSE REMAINING CANDIDATES, PROCESS FROM L TO R UNTIL ONE
        C     OF THE FOLLOWING IS DETECTED:  LINE START, RHE DETECT, LHE DETECT
        C
0047            DO 25 J=1,N
0048            IF(IRET(J).EQ.1.AND.IOUT(3,J)+IOUT(4,J).GE.1) GO TO 30
0050    25      CONTINUE
0051            GO TO 31      !NONE FOUND, CONTINUE PROCESSING
0052    30      LC=J
0053            RETURN
        C
        C TEST IF UNIQUE MIN SUM FOR  POSITIONS I-1,I,I+1
        C
0054    31      DO 32 J=2,N-4
0055            INV(J,6)=INV(J-1,2)+INV(J,2)+INV(J+1,2)
0056            IF(IRET(J).EQ.0) INV(J,6)=99
0058    32      CONTINUE
0059            CALL MINVAL(INV(1,6),N,IRET,LC,NLC)
0060            IF(NLC.EQ.1) RETURN
        C
        C  NO PREFERRED CHOICE...SELECT BY POSITION
        C
0062            CALL BEST(INV,N,IRET,LC,NLC,IPTCH)
0063            RETURN
0064            END
0001            SUBROUTINE MINVAL(INV,N,IRET,LC,NLC)
        C +*********************************************************
        C NAME: MINVAL
        C PURPOSE: FIND ALL MIN VALUES BETWEEN INV(2) TO INV(N-4).
        C ARGUMENTS:
        C     INV=INPUT VECTOR
        C     N=# ENTRIES (1ST AND LAST 4 ENTRIES NOT PROCESSED)
        C     IRET(I)=1 FOR EACH INV(I)=MIN, =0 OTHERWISE
```

```
             C      NLC=# MINS FOUND
             C      LC=INDEX OF LAST MIN
             C
             C -*************************************************
0002                DIMENSION INV(N),IRET(N)
             C
             C  FIND MINIMUM
             C
0003                LMIN=99
0004                DO 10 I=2,N-4
0005                IF(INV(I).LT.LMIN) LMIN=INV(I)
0007         10     CONTINUE
             C
             C  COUNT AND TAG MINS
             C
0008                LC=0
0009                NLC=0
0010                IRET(1)=0
0011                DO 20 I=2,N-4
0012                IRET(I)=0
0013                IF(INV(I).GT.LMIN) GO TO 20
0015                IRET(I)=1
0016                NLC=NLC+1
0017                LC=I
0018         20     CONTINUE
0019                RETURN
0020                END

0001                SUBROUTINE BEST(INV,N,IRET,LC,NLC,IPTCH)
             C +*************************************************
             C NAME: BEST
             C PURPOSE: SELECT SEGMENTATION POSITION BASED ON PITCH
             C ARGUMENTS:
             C    INV(I)=SV DATA, I=2,N-4
             C    N=MAX # ENTRIES (LAST 4 POSITIONS IGNORED)
             C    IRET(I)=1 FOR ALLOWABLE INV(I) CANDIDATES
             C    LC=RETURN INDEX OF INV FOR SEGMENTATION
             C    IPTCH=PITCH (10 OR 12)

C -*************************************************
0002                DIMENSION INV(N),IRET(N)
0003                IF(NLC.EQ.1) RETURN
             C
             C  ORDER OF PREFERENCE FOR MIN SV CHOICE:
             C    10 PITCH: 21,22,20,23,19,18,17
             C    12 PITCH: 17,18,16,19,15,20
             C
0005                IF(IPTCH.EQ.12) GO TO 200
0007                DO 10 J=2,N-4
0008                IF(INV(J).EQ.21.AND.IRET(J).EQ.1) GO TO 15
0010                IF(INV(J).EQ.22.AND.IRET(J).EQ.1) GO TO 15
0012         10     CONTINUE
0013                DO 12 J=2,N-4
0014                IF(INV(J).EQ.20.AND.IRET(J).EQ.1) GO TO 15
0016                IF(INV(J).EQ.23.AND.IRET(J).EQ.1) GO TO 15
0018         12     CONTINUE
0019                DO 13 J=2,N-4
0020                IF(INV(J).EQ.19.AND.IRET(J).EQ.1) GO TO 15
0022         13     CONTINUE
0023                DO 14 J=2,N-4
0024                IF(INV(J).EQ.18.AND.IRET(J).EQ.1) GO TO 15
0026         14     CONTINUE
0027                DO 144 J=2,N-4
0028                IF(INV(J).EQ.17.AND.IRET(J).EQ.1) GO TO 15
0030         144    CONTINUE
0031                LC=1
0032                RETURN
0033         15     LC=J
0034                RETURN
0035         200    DO 210 J=2,N-4
0036                IF(INV(J).EQ.17.AND.IRET(J).EQ.1) GO TO 215
0038                IF(INV(J).EQ.18.AND.IRET(J).EQ.1) GO TO 215
0040         210    CONTINUE
0041                DO 212 J=2,N-4
```

```
0042          IF(INV(J).EQ.16.AND.IRET(J).EQ.1) GO TO 215
0044          IF(INV(J).EQ.19.AND.IRET(J).EQ.1) GO TO 215
0046   212    CONTINUE
0047          DO 213 J=2,N-4
0048          IF(INV(J).EQ.15.AND.IRET(J).EQ.1) GO TO 215
0050          IF(INV(J).EQ.20.AND.IRET(J).EQ.1) GO TO 215
0052   213    CONTINUE

0053          LC=1
0054          RETURN
0055   215    LC=J
0056          RETURN
0057          END

0037          IF(NLC.EQ.0) RETURN            !NO CANDIDATES--FORCE PITCH=18
       C
       C  TEST FOR ADJACENT DISCONTINUITY
       C
0039          LC=0
0040          NLC=0
0041          LMAX=3
0042          DO 75 I=6,10
0043          IF(IRET(I).EQ.0) GO TO 75
0045          IOUT(3,I)=MAX0(IOUT(2,I-1),IOUT(2,I+1))
0046          IF(IOUT(3,I)-IOUT(2,I).GT.LMAX) LMAX=IOUT(3,I)-IOUT(2,I)
0048   75     CONTINUE
0049          IF(LMAX.EQ.3) GO TO 81          !NO SIG DIFFS FOUND
0051          DO 80 I=6,10
0052          IF(IRET(I).EQ.0) GO TO 80
0054          IF(IOUT(3,I)-IOUT(2,I).EQ.LMAX) GO TO 77
0056          IRET(I)=0
0057          GO TO 80
0058   77     LC=I
0059          NLC=NLC+1
0060   80     CONTINUE
0061          IF(NLC.EQ.1) RETURN
       C
       C CHOOSE MIN ACCORDING TO FOLLOWING ORDER: 18,17,16,15,14
       C
       C
0063   81     IF(IRET(10).EQ.0) GO TO 82
0065          LC=10
0066          RETURN
0067   82     IF(IRET(9).EQ.0) GO TO 85
0069          LC=9
0070          RETURN
0071   85     IF(IRET(8).EQ.0) GO TO 90
0073          LC=8
0074          RETURN
0075   90     LC=7
0076          RETURN
0077          END

0001          SUBROUTINE LETGOT(IOUT,N,LC,IPTCH)
       C +***********************************************************
       C NAME: LETGOT
       C PURPOSE: SELECT TC SEGMENTATION POSITION FROM ANALYSIS OF SV DATA
       C ARGUMENTS:
       C      IOUT(1,I)=COLUMN SEPARATION POSITION (14-18 FOR SANS SERIF STYLES
       C      IOUT(2,I)=SV=SEPARATION VALUE FOR POSITION IN IOUT(1,I)
       C      N=# OF SV'S
       C      LC=RETURN DECISION INDEX, IOUT(1,LC)=SEPARATION POSITION
       C      IPTCH=PITCH=12

C -***********************************************************
0002          DIMENSION IOUT(7,15),IRET(15)
       C
       C  M=1ST CHAR OF PAIR?--IF SO, EXCLUDE POSITIONS 14 ,15 AND 16
       C
0003          IF(IOUT(2,6).LE.4.AND.IOUT(2,6).GE.2.AND.IOUT(2,1).GE.12.
              1   AND.IOUT(2,8).GE.12) GO TO 10
0005          IF(IOUT(2,7).LE.4.AND.IOUT(2,7).GE.2.AND.IOUT(2,2).GE.12.
              1   AND.IOUT(2,9).GE.12) GO TO 10
0007          GO TO 20
0008   10     IOUT(2,6)=99
```

```
0009            IOUT(2,7)=99
0010            IOUT(2,8)=99
         C
         C    M=LAST CHAR OF PAIR?--IF SO, EXCLUDE POSITIONS 17 AND 18
         C
0011  20        IF(IOUT(2,9).LE.4.AND.IOUT(2,9).GE.2.AND.IOUT(2,14).GE.12.
         1       AND.IOUT(2,7).GE.12) GO TO 40
0013            IF(IOUT(2,10).LE.4.AND.IOUT(2,10).GE.2.AND.IOUT(2,15).GE.12.
         1       AND.IOUT(2,8).GE.12) GO TO 40
0015            GO TO 50
0016  40        IOUT(2,9)=99
0017            IOUT(2,10)=99
0018  50        CONTINUE
         C
         C    FIND MINIMUM SEG VALUE(S)
         C
0019            LMIN=98
0020            DO 60 I=6,10
0021            IF(IOUT(2,I).LT.LMIN) LMIN=IOUT(2,I)
0023  60        CONTINUE
0024            LC=0
0025            NLC=0
0026            DO 70 I=6,10
0027            IRET(I)=0
0028            IF(IOUT(2,I).GT.LMIN) GO TO 70
0030            IRET(I)=1
0031            NLC=NLC+1
0032            LC=I
0033  70        CONTINUE
0034            IF(NLC.EQ.1)RETURN
0036            LC=10
```

I claim:

1. System for detecting an intercharacter boundary for a digital representation of a string of two or more characters extending in a first (X) direction against a background, said characters having a first (B) characteristic and said background having a second (W) characteristic, said digital representation including a bit for each pixel of an m row by n column array of pixels, each row of said array having m pixels in said X direction, and each column of said array having n pixels in a second (Y) direction, where said bits have a first binary value for pixels representative of said first (B) characteristic and have a second binary value for pixels representative of said second (W) characteristic, comprising:

A. means for generating a serpentine value (SV) signal for each of said n columns of pixels in said array, wherein the SV signal for the $i^{th}$ column, SV(i) is representative of the number of adjacent $i^{th}$ and $i+1^{th}$ column pixel pairs having one or more predetermined patterns in composite regions which include said $i^{th}$ and $i+1^{th}$ columns and which are contiguous to simple regions in the $i-d^{th}$ and $i+e+1^{th}$ columns, where d and e are integers greater than or equal to 1, wherein each composite region is a contiguous group of pixels in two or more adjacent columns bounded above and below by pixels having said W characteristic and wherein at least one pixel having said B characteristic in each row of said composite region has a boundary point in common with a pixel having said B characteristic in each adjacent row of said composite region, and wherein each simple region is a contiguous group of pixels in a column having said B characteristic and bounded above and below by pixels having said W characteristic, B. means for processing the succession of said SV signals to generate a boundary signal representative of a boundary column, column N, where N is an index representative of the position of said boundary column in said array, said column N being on a predetermined side of the nominal boundary between two of said characters.

2. The system of claim 1 further comprising:

C. means for generating a stream start (SS) signal for each of said n columns of pixels in said array, wherein the SS signal for the $i^{th}$ column, SS(i), is representative of the number of regions in said $i+1^{th}$ column which are contiguous to a region in the $i+2^{th}$ through the $i+2+r^{th}$ columns, where r is an integer greater than or equal to 0, and which are contiguous to pixels in said $i^{th}$ column having said W characteristic, D. means for generating a stream end (SE) signal for each of said m columns of pixels in said array, wherein the SE signal for the $i^{th}$ column, SE(i), is representative of the number of regions in said $i^{th}$ column which are contiguous to a region in the $i-1-s^{th}$ column through the $i-1^{th}$ column, where s is an integer greater than or equal to 0, and which are contiguous to pixels in said $i+1^{th}$ column having said W characteristic, and wherein said processing means includes means for processing the succession of said SS and SE values together with said succession of said SV values.

3. The system of claims 1 or 2 further comprising:

E. means for associating B pixels in and between columns N−g and N+1+f with one of the characters adjacent to said nominal boundary, where f and g are integers greater than or equal to zero.

4. The system of claim 3 wherein said associating means includes:

means for identifying contiguous simple regions in the $N+1^{th}$ through $N+1+f^{th}$ columns which are contiguous to a region in column N and wherein the one of said contiguous regions farthest from column N is contiguous only to pixels having said W characteristic in the next following column, and means for associating pixels of those identified regions with a character on one side of column N, and associating all other pixels having said B characteristic and in the $N-1-g^{th}$ through the $N^{th}$ columns with said character to said one side of said $N^{th}$ column, means for identifying contiguous simple regions in said $N-g^{th}$ through the $N^{th}$ columns which are contiguous to a simple region in said $N+1^{th}$ column and wherein the one of said contiguous regions farthest from column N is contiguous only to pixels having said W characteristic in the next preceding column and means for associating pixels of those identified regions with a character on the other side of column N, and associating all other pixels having said B characteristic and in said $N+1^{th}$ through the $N+2+f^{th}$ columns with said character to other side of column N.

5. The system of claims 1 or 2 wherein one of said predetermined patterns is BB.

6. The system of claims 1 or 2 wherein one of said predetermined patterns is WB and another of said predetermined patterns is BB.

7. The system of claims 1 or 2 wherein one of said predetermined patterns is BW and another of said predetermined patterns is BB.

8. The system of claims 1 or 2 wherein one of said predetermined patterns is BW and another of said predetermined patterns is WB.

9. The system according to claims 1 or 2 wherein $d=1$ and $e=1$.

10. Method of detecting an intercharacter boundary for a digital representation of a string of two or more characters extending in a first (X) direction against a background, said characters having a first (B) characteristic and said background having a second (W) characteristic, said digital representation including a bit for each pixel of an m row by n column array of pixels, each row of said array having m pixels in said X direction, and each column of said array having n pixels in a second (Y) direction, where said bits have a first binary value for pixels representative of said first (B) characteristic and have a second binary value for pixels representative of said second (W) characteristic, comprising the steps of:

A. generating a serpentine value (SV) signal for each of said n columns of pixels in said array, wherein the SV signal for the $i^{th}$ column, SV(i), is representative of the number of adjacent $i^{th}$ and $i+1^{th}$ column pixel pairs having one or more predetermined patterns in composite regions which include said $i^{th}$ and $i1^{th}$ columns and which are contiguous to simple regions in the $i-d^{th}$ and $i+e+1^{th}$ columns, where d and e are integers greater than or equal to 1, wherein each composite region is a contiguous group of pixels in two or more adjacent columns bounded above and below by pixels having said W characteristic and wherein at least one pixel having said B characteristic in each row of said composite region has a boundary point in common with a pixel having said B characteristic in each adjacent row of said composite region, and wherein each simple region is a contiguous group of pixels in a column having said B characteristic and bounded above and below by pixels having said W characteristic, B. processing the succession of said SV signals to generate a boundary signal representative of a boundary column, column N, where N is an index representative of the position of said boundary column in said array, said column N being on a predetermined side of the nominal boundary between two of said characters.

11. The method of claim 10 comprising the further steps of:

C. generating a stream start (SS) signal for each of said n columns of pixels in said array, wherein the SS signal for the $i^{th}$ column, SS(i), is representative of the number of regions in said $i+1^{th}$ column which are contiguous to a region in the $i+2^{th}$ through the $i+2+r^{th}$ columns, where r is an integer greater than or equal to 0, and which are contiguous to pixels in said $i^{th}$ column having said W characteristic, D. generating a stream end (SE) signal for each of said m columns of pixels in said array, wherein the SE signal for the $i^{th}$ column, SE(i), is representative of the number of regions in said $i^{th}$ column which are contiguous to a region in the $i-1-s^{th}$ column through the $i-1^{th}$ column, where s is an integer greater than or equal to 0, and which are contiguous to pixels in said $i+1^{th}$ column having said W characteristic, and wherein said processing step includes the sub-step of processing the succession of said SS and SE values together with said succession of said SV values.

12. The method of claims 10 or 11 comprising the further step of:

E. associating B pixels m and between columns $N-g$ and $N+1+f$ with one of the characters adjacent to said nominal boundary, where f and g are integers greater than or equal to zero.

13. The method of claim 12 wherein said associating step includes the sub-steps of:

identifying contiguous simple regions in the $N+1^{th}$ through the $N+1+f^{th}$ columns which are contiguous to a region in column N and wherein the one of said contiguous regions farthest from column N is contiguous only to pixels having said W characteristic in the next following column, and associating pixels of those identified regions with a character on one side of column N, and associating all other pixels having said B characteristic and in the $N-1-g^{th}$ through the $N^{th}$ columns with said character to said one side of said $N^{th}$ column, identifying simple regions in said $N-g^{th}$ through the $N^{th}$ columns which are contiguous to a simple region in said $N+1^{th}$ column and wherein the one of said contiguous regions farthest from column N is contiguous only to pixels having said W characteristic in the next preceding column, and associating pixels of those identified regions with a character on the other side of column N, and associating all other pixels having said B characteristic and in said $N+1^{th}$ and $N+2^{th}$ columns with said character to said other side of column N.

14. The method of claims 10 or 11 wherein one of said predetermined patterns is BB.

15. The method of claims 10 or 11 wherein one of said predetermined patterns is WB and another of said predetermined patterns is BB.

16. The method of claims 10 or 11 wherein said predetermined patterns is BW and another of said predetermined patterns is BB.

17. The method of claims 10 or 11 wherein one of said predetermined patterns is BW and another of said predetermined patterns is WB.

18. The method according to claims 10 or 11 wherein d=1 and e=1.

* * * * *